(12) United States Patent
Miyasaka

(10) Patent No.: US 9,817,432 B2
(45) Date of Patent: Nov. 14, 2017

(54) MICROCOMPUTER AND METHOD FOR CORRECTING CLOCK THEREOF

(71) Applicant: Calsonic Kansei Corporation, Saitama, Saitama (JP)

(72) Inventor: Hiroshi Miyasaka, Kasukabe (JP)

(73) Assignee: Calsonic Kansei Corporation, Saitama, Saitama (JP)

(*) Notice: Subject to any disclaimer, the term of this patent is extended or adjusted under 35 U.S.C. 154(b) by 0 days.

(21) Appl. No.: 15/105,987

(22) PCT Filed: Nov. 11, 2014

(86) PCT No.: PCT/JP2014/079886
§ 371 (c)(1),
(2) Date: Jun. 17, 2016

(87) PCT Pub. No.: WO2015/093187
PCT Pub. Date: Jun. 25, 2015

(65) Prior Publication Data
US 2017/0038790 A1    Feb. 9, 2017

(30) Foreign Application Priority Data

Dec. 18, 2013  (JP) .................................. 2013-261052

(51) Int. Cl.
*G06F 1/32* (2006.01)
*G06F 1/08* (2006.01)

(52) U.S. Cl.
CPC ................. *G06F 1/08* (2013.01); *G06F 1/324* (2013.01); *Y02B 60/1217* (2013.01)

(58) Field of Classification Search
CPC ....................................................... G06F 1/324
See application file for complete search history.

(56) References Cited

U.S. PATENT DOCUMENTS 5,729,722 A * 3/1998 Matsumoto ........... G06F 1/3203
                                                           713/601
6,292,062 B1 * 9/2001 Bourk ..................... G04F 1/005
                                                           327/144

(Continued)

FOREIGN PATENT DOCUMENTS

CN         1356846 A      7/2002
CN       103135661 A      6/2013

(Continued)

*Primary Examiner* — Thomas Lee
*Assistant Examiner* — Gary Collins
(74) *Attorney, Agent, or Firm* — Bruzga & Associates; Charles E. Bruzga; Shlomo S. Moshen

(57) ABSTRACT

Problem
A sub clock for a sleep mode in a a microcomputer is retained to be operable with high accuracy.
Solution
A sub clock 20 counts oscillating pulses of a CR oscillating circuit 21 by a loop counter 22, and outputs a clock signal each time the oscillating pulses reach a target count Pm. A CPU 11 counts oscillating pulses of the CR oscillating circuit 21 in a predetermined time measured by a time counter 25 in response to a clock signal of a main clock 13 by a crystal oscillator, and corrects the target count Pm according to a pulse count P thereof. Since the real count state is obtained based upon the clock signal of the main clock having high frequency accuracy without the estimation of the sub clock 20, the high accuracy of the sub clock is retained even if environmental changes such as temperatures occur.

11 Claims, 2 Drawing Sheets

(56) References Cited

U.S. PATENT DOCUMENTS

| | | | | |
|---|---|---|---|---|
| 6,333,939 | B1 * | 12/2001 | Butler | G06F 1/08 |
| | | | | 370/350 |
| 6,650,189 | B1 * | 11/2003 | Romao | H04B 1/1615 |
| | | | | 327/144 |
| 8,589,715 | B2 * | 11/2013 | Curtiss | G06F 1/3203 |
| | | | | 455/502 |
| 2002/0065117 | A1 | 5/2002 | Suda | |
| 2004/0162657 | A1 | 8/2004 | Ishida | |
| 2005/0228562 | A1 | 10/2005 | Sayama et al. | |
| 2008/0222440 | A1 * | 9/2008 | Jones | G06F 1/14 |
| | | | | 713/400 |
| 2009/0199037 | A1 * | 8/2009 | Venkatesh | G06F 1/12 |
| | | | | 713/502 |
| 2013/0145198 | A1 | 6/2013 | Yasuda | |
| 2014/0021997 | A1 * | 1/2014 | Liu | H04W 52/029 |
| | | | | 327/292 |

FOREIGN PATENT DOCUMENTS

| | | |
|---|---|---|
| JP | 7-181273 A | 7/1995 |
| JP | 2004-226165 A | 8/2004 |
| JP | 2005-257494 A | 9/2005 |
| JP | 2005-299517 A | 10/2005 |
| JP | 2011-60159 A | 3/2011 |
| JP | 2013-167597 A | 8/2013 |

* cited by examiner

MICROCOMPUTER AND METHOD FOR CORRECTING CLOCK THEREOF

TECHNICAL FIELD

This invention relates to a microcomputer having a clock for a sleep mode of a CPU different from that for a regular operating mode of the CPU, and a method for correcting the clock for the sleep mode.

BACKGROUND ART

In recent vehicles, not only operations of various kinds of devices during the vehicle running but also automatic light-on/off of a room lamp, keyless lock and unlock of doors, security against theft, engine start and the like after the vehicle stop are integrally controlled by a microcomputer. Since the microcomputer causes a CPU to execute a given computation process based upon a clock signal, the microcomputer is provided with a clock using, for example, a crystal oscillator for generating the clock signal.

In the integral control of the vehicle, the CPU transfers from a regular operating mode for various controls required during the vehicle driving to a sleep mode for power saving when a predetermined condition is established following the engine stop, but even in the sleep mode, predetermined clock signals are required for intermittent operations of the components, for example.

In the regular operating mode, there are many targets to be controllably processed, and a clock using a crystal oscillator that has a high oscillating frequency and high frequency accuracy of approximately 0.005% is appropriate therein, but as the accuracy becomes higher, the cost of the clock is the higher and the consumption power is the larger. Therefore particularly during the engine stop when a battery is not charged, it is preferable that the clock is also switched to a clock small in power consumption, which is different from the clock at the regular operating time, in response to transferring the CPU to the sleep mode for power saving.

Therefore when the clock for sleep time is configured, for example, using a CR oscillating circuit, the clock becomes low in costs and low in consumed power, but an error in oscillating frequency becomes large depending upon an atmosphere temperature or the like, for example, the oscillating frequency changes to the extent of 5%. As a result, the switching to the clock small in consumed power causes deterioration in frequency accuracy, and it is necessary to take measures of maintaining the clock accuracy because of a higher demand for clock accuracy in the sleep mode as well.

Conventionally, for example, in Patent Document 1 there is proposed the technique of a clock with a CR oscillating circuit where an oscillating frequency of the CR oscillating circuit measured when an ambient temperature and a power source voltage conform to reference measurement conditions is stored as a reference oscillating frequency, and a frequency variation from the reference oscillating frequency is computed based upon characteristics between a predetermined temperature and the oscillating frequency and characteristics between the voltage and the oscillating frequency from detection values of the current temperature and voltage to find the current oscillating frequency for correction and keep the accuracy of the oscillating frequency.

In addition, in Patent Document 2 there is proposed the technique in which data determining a communication rate for making a data transmission time of one frame managed in a communication circuit constant based upon oscillating output characteristics varying with temperatures of the CR oscillating circuit is stored and the stored data is read out according to a detection value of the temperature to set the determined communication rate to the communication circuit and keep the control accuracy.

PRIOR ART DOCUMENT

Patent Document

Patent Document 1: Japanese Patent Laid-Open No. 5-75445 A
Patent Document 2: Japanese Patent Laid-Open No. 2006-270917 A

SUMMARY OF THE INVENTION

Problem to Solution

Any of the above-mentioned conventional techniques is, however, configured to make the correction by estimating the current oscillating frequency or error state based upon the indirect current data calculated by referring to characteristics or profiles measured before shipment or vehicle installation of the microcomputer, and has a problem that it is difficult to test whether or not the estimated value conforms exactly to the current state. Therefore it cannot be said that the above technique can securely meet the demand for the high accuracy.

Accordingly, the present invention is made in view of the above conventional problem and has an object of providing a microcomputer that can keep a clock used in a sleep mode for power saving with higher accuracy, and a method for correcting the clock.

Solution to Problem

Therefore, according to the present invention, a microcomputer having at least one clock is configured such that count data is obtained from a reference clock signal source higher in frequency accuracy than the clock, count data of the clock is measured on a basis of the count data from the reference clock signal source, the count data of the clock is stored in a memory, and a clock signal of the clock is corrected based upon the latest count data of the clock stored in the memory at the transfer from the regular operating mode to a sleep mode.

Advantageous Effect of the Invention

According to the present invention, since the count data of the clock is set as the direct measurement target, the real count state is found without estimation, and a secure correction can be made based upon the real measurement result to meet the demand for the high accuracy.

DESCRIPTION OF EMBODIMENTS

Hereinafter, an explanation will be made of an embodiment of the present invention.

Figure 1:
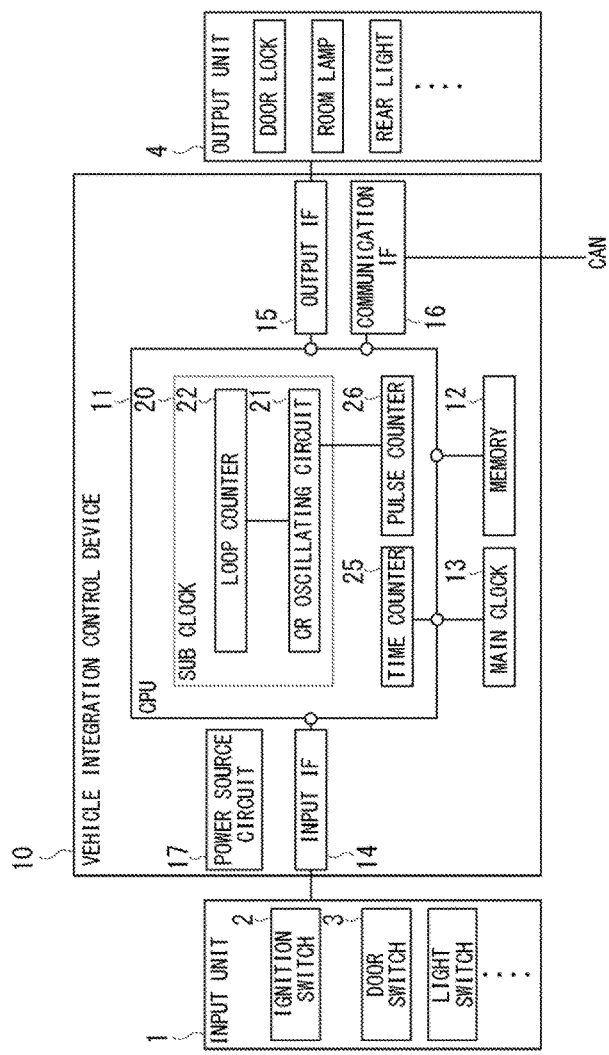
FIG. 1 is a block diagram illustrating the configuration of a vehicle integration control device according to an embodiment of the present invention.

FIG. 1 is a block diagram illustrating a vehicle integration control device according to the present embodiment.

A vehicle integration control device 10 is configured of a microcomputer including a CPU 11, a memory 12 for storing programs and data, a main clock 13 using a crystal oscillator for supplying clock signals to the CPU 11, an input interface (input IF) 14 for connecting an input unit 1 such as various switches including an external ignition switch 2 and an external door switch 3 and sensors to the CPU 11, an output interface (output IF) 15 for connecting an output unit 4 such as door locks, lamps and lights to the CPU 11, a communication interface 16 for in-vehicle network connection (CAN), and a power source circuit 17 as a drive source therefor.

The CPU 11 can be switched from a regular operating mode as an operating mode to a sleep mode for power saving, and incorporates a sub clock 20, a time counter 25 and a pulse counter 26 therein.

The sub clock 20 includes a CR oscillating circuit 21 and a loop counter 22 for counting oscillating pulses of the CR oscillating circuit 21.

The time counter 25 counts clock signals that are input to the CPU 11 from the main clock 13 to measure a predetermined time T which will be described later.

The pulse counter 26 counts oscillating pulses of the CR oscillating circuit 1 in the predetermined time T at the operating of the time counter 25.

Based upon an ON operation to the ignition switch 2 in a vehicle, the CPU 11 activates the main clock 13 and operates in a regular operating mode, and executes a computation process based upon the clock signal from the main clock 13.

Here, an oscillating frequency of the main clock 13 is 4 MHz and the clock signal is used as a timing signal for computation process as it is, but there are some cases where, depending upon the CPU 11, the clock signal from the main clock 13 is divided or multiplied to form an internal clock, which will be used as a timing signal for computation process.

The ignition switch 2 is tuned off to stop an engine, and when a predetermined condition is established, for example, when a predetermined time elapses after a door opens/closes in the vehicle stop state, the CPU 11 transfers to a sleep mode. For transferring to the sleep mode, the CPU 11 ceases the main clock 13, and turns on the incorporated sub clock 20 to intermittently execute a predetermined monitoring such as presence/absence of interrupt using the clock signal as a timing signal.

Correction of the sub clock 20 will be made for the sleep mode transfer. Hereinafter, an explanation will be made of the correction of the sub clock 20.

First, the sub clock 20 is configured such that the oscillating frequency of the CR oscillating circuit 21 is set to 125 KHz and for example, a target count Pm of the loop counter 22 is set to 125000, wherein each time the loop counter 22 reaches the target count Pm, the sub clock 20 comes out of the loop to output a clock signal. Therefore a clock signal having a cycle of one sec is output as a reference state. A clock interval (cycle of one sec) of the reference state is called a reference time S.

The CPU 11 refers to a clock signal of the main clock 13 higher in frequency accuracy than the sub clock 20 as a reference clock signal by the interrupt of an appropriate-time interval during the regular operating mode to measure the state of the sub clock 20.

Specifically the pulse counter 26 counts oscillating pulses of the CR oscillating circuit 21 in the sub clock 20 in a predetermined time T found by counting clock signals from the main clock 13 by the time counter 25 to find a pulse count P.

This pulse count P is repeatedly found, and the loop count 22 in the sub clock 20 is corrected based upon the latest pulse count P found finally before transfer to the sleep mode.

That is, when the predetermined time T is set to, for example, one sec that is the same as the reference time S, a reference count Po set to the target count Pm as the pulse number that will be output by the CR oscillating circuit 21 amounts to 125000 during the predetermined time T. However, in a case where the measured pulse count P is 120000, there is an error $\alpha$ of 5000 pulses between the target count Pm and the measured count P. Therefore, when the target count Pm of the loop counter 22 is retained to 125000 as the reference count Po, the clock signal that is output after having reached the target count Pm is delayed from the reference time S, so that the clock interval (cycle) is longer than one sec.

Therefore when the target count Pm of the loop counter 22 is corrected by the amount of the above error $\alpha$, the clock signal is output in a cycle extremely close to the reference time S without delay. Therefore the target count Pm is corrected by the formula of $Pm=Pm-\alpha$.

In a case where the measured pulse count P is more than the reference count Po, the clock signal is output in a cycle extremely close to the reference time S without advance in the same correction manner.

Here, since the calculation formula of the error is $\alpha=Pm-P$, the target count Pm after the correction is expressed by $Pm=-\alpha=Pm-(Pm-P)=P$.

That is, a value of the new Pm is made to the pulse count P. In other words, the correction is only made to change the target count Pm to the pulse Count P as the measurement result.

It should be noted that in the above example, the predetermined time T to be measured is set to the same as the reference time S of the clock signal of the sub clock 20, and a difference between the target count Pm and the measured pulse count P is set to the error $\alpha$, but, for example, in a case where the predetermined time is set to a half of the reference time S for shortening the measurement time, the target count Pm is only corrected by setting a difference between a value twice the measured pulse count P and the target count Pm as the error $\alpha$.

Accordingly, when the predetermined time T is generalized to be k times the reference time S, in a case where $\alpha=Pm-(P/k)$, the target count Pm is corrected to be $Pm=Pm-\alpha=Pm-(Pm-(P/k))=P/k$.

It should be noted that when k is larger than 1, P-k is an integral number by an INT function.

Figure 2:
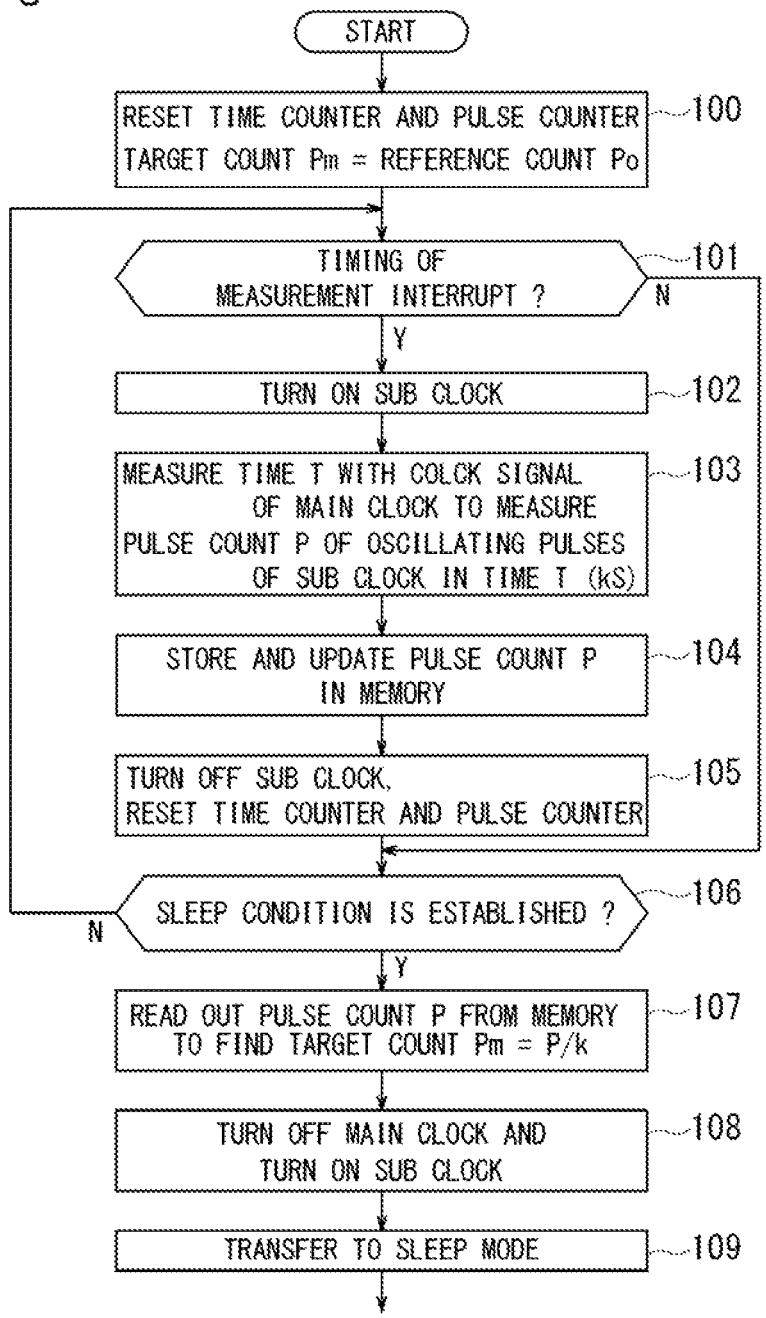
FIG. 2 is a flow chart illustrating a flow of control for correction of a sub clock according to the embodiment.

FIG. 2 is a flow chart illustrating the flow of control for correction of the sub clock 20 in the CPU 11.

When the ignition switch 2 is turned on, the CPU 11 activates the main clock 13 and enters into the regular operating mode, wherein the CPU 11 is operable using a clock signal from the main clock 13 as the basis of a processing timing. In this way, the control for the vehicle running by the vehicle integration control device 10 is started.

The CPU 11 resets the time counter 25 and the pulse counter 26 as the initialization in step 100, and also sets a reference count Po (125000 to S=1 msec in a case of 125 KHz) corresponding to a predetermined reference time S of a clock signal to a target count Pm of the loop counter 22 in the sub clock 20.

In step 101 it is checked whether or not the process is an interrupt timing of the clock measurement. When it is the interrupt timing, the process goes to step 102, and when it is not the interrupt timing, the process goes to step 106.

In step 102 the sub clock 20 incorporated in the CPU 11 is turned on. In step 103 the time counter 25 starts to count clock signals from the main counter 13, and at the same time, the count of the pulse counter 26 starts to measure oscillating pulses of the sub clock 20 (CR oscillating circuit 21) in a predetermined time T and obtain a pulse count P. The predetermined time T is preliminarily defined as k times the reference time S.

In the next step 104 the measured pulse count P is stored in the memory 12. In a case where the pulse count P in the previous flow is stored in the memory 12, the pulse count P is updated by overwrite.

Thereafter, in step 105 the sub clock 20 is turned oft and the process goes to step 106. At this time the time counter 25 and the pulse counter 26 are also reset.

In step 106 it is checked whether or not a predetermined condition for the sleep including the turnoff of the ignition switch 2 is established in the input unit 1. When it is not established, the process goes back to step 101, and when it is established, the process goes to step 107.

In step 107 the pulse count P stored in the memory 12 is read out to correct a value of the target count Pm of the loop counter 22 in the sub clock 20 to P/k.

In step 108 the main clock 13 is turned off and the sub clock 20 is turned on, thus switching the clock.

In step 109 the CPU 11 itself transfers to the sleep mode. Thereafter, it is checked whether or not the condition in the regular operating mode is established. When it is established, the switching of the operation mode will be performed, but the explanation is omitted.

As described above, the error of the sub clock 20 is corrected based upon the latest oscillating state of the CR oscillating circuit 21 immediately before the transfer to the sleep mode, and the CPU 11 can execute a predetermined process based upon the clock signal with the accuracy of the level equivalent to the main clock 13 with high accuracy, in the sleep mode as well.

In the present embodiment, the vehicle integration control deice 10 corresponds to a microcomputer in the present invention, particularly the sub clock 20 corresponds to a clock for a sleep mode, and the main clock 13 corresponds to a reference clock signal source. The CR oscillating circuit 21 in the sub clock 20 corresponds to an oscillating source of the clock.

The clock signal of the main clock 13 corresponds to count data from the reference clock signal source, and the oscillating pulse of the CR oscillating circuit 21 corresponds to count data of the clock.

The route configuration in which the clock signal of the main clock 13 input to the CPU 11 is incorporated in the time counter 25 corresponds to reference data obtaining means in the present invention.

Step 103 in the flow chart in FIG. 2 corresponds to a first step in the present invention, step 104 corresponds to measuring means and a second step, and step 108 corresponds to correcting means and a third step.

The present embodiment is configured as mentioned above, wherein the sub clock 20 is formed of the CR oscillating circuit 21 and the loop counter 22 that counts oscillating pulses thereof and outputs a clock signal each time the oscillating pulses reach the target count Pm, the oscillating pulses of the sub clock 20 (CR oscillating circuit 21) are counted in a predetermined time T measured by the clock signal of the main clock 13 higher in frequency accuracy than the sub clock 20, and the clock signal of the sub clock 20 is corrected by correcting the target count Pm according to the pulse count P of the oscillating pulses. Therefore without the estimation, the real count state is acquired, based upon which the secure correction is performed.

In addition, since the target count Pm a the loop counter 22 is corrected according to the pulse count P measured on a basis of the measured time by the clock signal of the main clock 13 as described above, even with the sub clock 22 configured to be low in costs and low in consumption power, the clock signal with accuracy of the level equivalent to the main clock 13 with the high accuracy is output, thus making it possible to meet the demand for the high accuracy.

Particularly with regard to the state of the sub clock 22, the CPU 11 operates the sub clock 20 by predetermined time intervals during the regular operating mode to store the pulse count P of the oscillating pulses in the memory 12, and when the CPU 11 transfers from the regular operating mode to the sleep mode, the latest pulse count P stored in the memory 12 is used to correct the target count Pm. Therefore for entering into the sleep mode, the correction adapted for the latest state of the sub clock 20 is performed all the time to stably output the clock signal with high accuracy.

Since the sub clock 20 is incorporated in the CPU 11, it is easy to configure the sub clock 20 to be low in consumption power, and the wiring and the installation thereof in the vehicle integration control device 10 become unnecessary.

It should be noted that in the above embodiment the clock signal from the main clock 13 provided with the crystal oscillator and attached on the exterior of the CPU 11 is used as the count data for measuring the predetermined time T. However, for example, reference radio wave data indicating a reference time or a time signal included in a GPS signal that is received and extracted in the other in-vehicle device may be incorporated as count data from a reference clock signal source through an in-vehicle network to be used at the time of measuring the predetermined time T.

With this structure as well, it is possible to output the clock signal with the high accuracy from the sub clock 20 for the sleep mode.

In addition, in the present embodiment, because of easy configuration for low consumption power and low costs as described before, the clock for the sleep mode is formed with the sub clock 20 having the CR oscillating circuit 21 incorporated in the CPU 11 as the oscillating source, but the present invention is not limited thereto, and the clock may be attached on the exterior of the CPU 11.

Further, for example, as long as the clock for the sleep mode is formed with any component that is lower in the oscillating frequency and lower in the consumption power than the main clock 13, the clock for the sleep mode is not limited to the CR oscillating circuit, but and may be formed with a crystal oscillator or a ceramic oscillator.

It should be noted that any of the numerical values indicated in the present embodiment is just exemplified, and the present invention is not limited to the described numerical values.

DESCRIPTION OF REFERENCE SIGNS

1 Input unit
2 Ignition switch
3 Output unit
10 Vehicle integration control device
11 CPU 12 Memory
13 Main clock
14 input interface
15 Output interface
16 Communication interface
17 Power source circuit
20 Sub clock
21 CR oscillating circuit
22 Loop counter
25 Time counter
26 Pulse counter

What is claimed is:

1. A microcomputer including at least one clock comprising:
   a) a reference data obtaining unit configured to obtain count data from a reference clock signal source higher in frequency accuracy than the clock;
   b) a measuring unit configured to measure count data of the clock on a basis of the count data from the reference clock signal source;
   c) a memory for storing the count data of the clock; and
   d) a correcting unit configured to correct a clock signal of the clock based upon the measured result by the measuring unit;
   e) the measuring unit operating the clock by a predetermined time interval at a regular operating mode of a CPU to measure the count data of the clock and store the count data of the clock in the memory;
   f) the correcting unit correcting the clock signal of the clock using the latest count data of the clock stored in the memory at the transfer from the regular operating mode to a sleep mode;
   g) the clock including an oscillating source and a loop counter for counting oscillating pulses from the oscillating source, the clock outputting a clock signal each time the oscillating pulses reach a target count of the loop counter corresponding to a reference time;
   h) the measuring unit finding a pulse count by counting the oscillating pulses of the clock in a predetermined time measured by the count data from the reference clock signal source;
   i) the clock intermittently outputting the clock signal during the sleep mode, and the CPU executing an operation during the sleep mode using the clock signal as a timing signal,
   j) the reference time being a clock interval of the clock signal, and
   k) the correcting unit correcting the target count of the loop counter corresponding to the reference time according to the pulse count found by the measuring unit.

2. The microcomputer according to claim 1, wherein the clock is incorporated in the CPU to be provided with a CR oscillating circuit as the oscillating source.

3. The microcomputer according to claim 1, wherein the reference clock signal source is a main clock connected to the CPU for a regular operating mode, and the clock is a sub clock for a sleep mode different from the main clock.

4. The microcomputer according to claim 1, wherein the correcting unit corrects the target count of the loop counter based on the pulse count found by the measuring unit and a ratio of the predetermined time to the reference time.

5. The microcomputer according to claim 1, wherein the correcting unit corrects the target count of the loop counter to satisfy the following formula:

$$Pm=P/k$$

where Pm is the target count of the loop counter, P is the pulse count found by the measuring unit, and k is the ratio of the predetermined time to the reference time.

6. The microcomputer according to claim 2, wherein the reference clock signal source is a main clock connected to the CPU for a regular operating mode, and the clock is a sub clock for a sleep mode different fror the main clock.

7. A method for correcting a clock in a microcomputer, the microcomputer including at least one clock, comprising:
   a) a first step for obtaining count data from a reference clock signal source higher in frequency accuracy than the clock;
   b) a second step for measuring count data of the clock on a basis of the count data from the reference clock signal source; and
   c) a third step for correcting a clock signal of the clock based upon the measured result of the second step;
   d) the second step operating the clock by a predetermined time interval at a regular operating mode of a CPU to measure the count data of the clock and store the count data of the clock in a memory;
   e) the third step correcting the clock signal of the clock using the latest count data of the clock stored in the memory at the transfer from the regular operating mode to a sleep mode;
   f) the clock including an oscillating source and a loop counter for counting oscillating pulses from the oscillating source, the clock outputting a clock signal each time the oscillating pulses reach a target count of the loop counter corresponding to a reference time;
   g) the second step finds a pulse count by counting the oscillating pulses of the clock in a predetermined time measured by the count data from the reference clock signal source;
   h) the clock intermittently outputting the clock signal during the sleep mode, and the CPU executing an operation during the sleep mode using the clock signal as a timing signal,
   i) the reference time being a clock interval of the clock signal, and
   j) the third step being executed by correcting the target count of the loop counter corresponding to the reference time according to the pulse count found by the second step.

8. The method for correcting the clock in the microcomputer according to claim 7, wherein
   the first step reads out a clock signal in a main clock connected to the CPU for a regular operating mode, as the count data from the reference clock signal source, and
   the second step measures a clock signal in a sub clock for a sleep mode different from the main clock, as the count data of the clock.

9. The method for correcting the clock in the microcomputer according to claims 7, wherein
   the first step reads out a reference radio wave or a clock signal of a GPS signal, as the count data from the reference clock signal source.

10. The method for correcting the clock in the microcomputer according to claim 7, wherein
    the third step is executed by correcting the target count of the loop counter based on the pulse count found by the measuring unit and a ratio of the predetermined time to the reference time.

11. The method for correcting the clock in the microcomputer according to claim 7, wherein
the third step is executed by correcting the target count of the loop counter to satisfy the following formula:

$$Pm=P/k$$

where Pm is the target count of the loop counter, P is the pulse count found by the measuring unit, and k is the ratio of the predetermined time to the reference time.

* * * * *